3,775,420
N-OXIDES OF INDOLE FUSED HETEROCYCLIC COMPOUNDS

David R. Herbst, Wayne, and Herchel Smith, Bryn Mawr, Pa., assignors to American Home Products Corporation, New York, N.Y.
Continuation-in-part of application Ser. No. 38,913, May 19, 1970, which is a continuation-in-part of application Ser. No. 889,867, Dec. 22, 1969, now abandoned, and a continuation-in-part of applications Ser. No. 153,441, June 15, 1971, and Ser. No. 258,286, May 31, 1972. This application Aug. 10, 1972, Ser. No. 279,419
Int. Cl. C07d 27/36
U.S. Cl. 260—293.53          10 Claims

ABSTRACT OF THE DISCLOSURE

The N-oxides of substituted 2,3,5,6,11,11b-hexahydro-1H-indolizino[8,7-b]indoles and 1,2,3,4,6,7,12,12b-octahydroindolo[2,3-a]quinolizines are described. The compounds possess analgesic activity.

---

This application is a continuation-in-part of copending U.S. patent application, Ser. No. 38,913, filed May 19, 1970; which is a continuation-in-part of U.S. patent application, Ser. No. 889,867, filed Dec. 22, 1969, now abandoned. This application is also a continuation-in-part of copending U.S. patent applications, Ser. No. 258,286, filed May 31, 1972, and Ser. No. 153,441, filed June 15, 1971.

BACKGROUND OF THE INVENTION

This invention relates to compositions of matter classified in the art of chemistry as the N-oxides of indolizino[8,7-b]indoles and indolo[2,3-a]quinolizines.

SUMMARY OF THE INVENTION

The invention sought to be patented as a composition of matter, is described as residing in the concept of an analgesic compound of the formula:

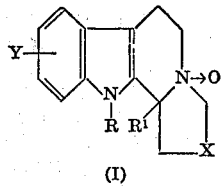

(I)

wherein:

(i) R is a methyl, $R^1$ is methyl, X is —$CH_2$—, and Y is hydrogen;
(ii) R is methyl, $R^1$ is ethyl, X is —$CH_2$—, and Y is hydrogen;
(iii) R is ethyl, $R^1$ is methyl, X is —$CH_2$—, and Y is hydrogen;
(iv) R is methyl, $R^1$ is methyl, X is —$CH_2$—, and Y is methyl fixed in the 10-position;
(v) R is methyl, $R^1$ is methyl, X is —$CH_2$—, and Y is fluorine fixed in the 8-position;
(vi) R is methyl, $R^1$ is methyl, X is

and Y is hydrogen; or
(vii) R is methyl, $R^1$ is methyl, X is —$CH_2$—$CH_2$—, and Y is hydrogen;

and the pharmacologically acceptable acid addition salts thereof.

The tangible embodiments of the compositions of the invention, as the hydrochloride salts, possess the inherent general physical properties of being high melting solids soluble in water, dimethylformamide and ethanol and insouble in ether and tetrahydrofuran.

Examination of compounds produced according to the hereinafter described processes by means of polarimetry and ultraviolet, infrared, mass and nuclear magnetic resonance spectroscopy provides data confirming the molecular structures hereinbefore set forth. The aforementioned physical characteristics taken together with the nature of the starting materials, the mode of synthesis, and the elemental analyses positively confirm the structures of the compositions sought to be patented.

The tangible embodiments of the invention possess the inherent applied use characteristic of exerting an analgesic effect as evidenced by standard pharmacological tests in standard laboratory animals. The analgesic activity can be elicited by following the method of D'Amour and Smith, J. Pharmacol., 72:74 (1941); the details of which are given herein in Example VIII.

Using this method, the compounds of the invention exhibit analgesic activity (orally) at a dosage range of about 2 to about 15 m./kg. of body weight.

Of particular interest are the dl- and d-2,3,5,6,11,11b-hexahydro - 11,11b - dimethyl 1H-indolizino[8,7-b]indole 4-oxide, hydrochlorides which possess marked analgesic activity.

DESCRIPTION OF THE DRAWING

FIG. I illustrates schematically, the preparation of 11,11b - di(lower)alkyl - 2,3,5,6,11,11b-hexahydro indolizino[8,7-b]indoles (VIII), which are the starting materials for the $N_b$-oxide compounds of Formula I when X is —$CH_2$— and Y is hydrogen.

DESCRIPTION OF THE PREFERRED EMBODIMENTS

Figure 1:
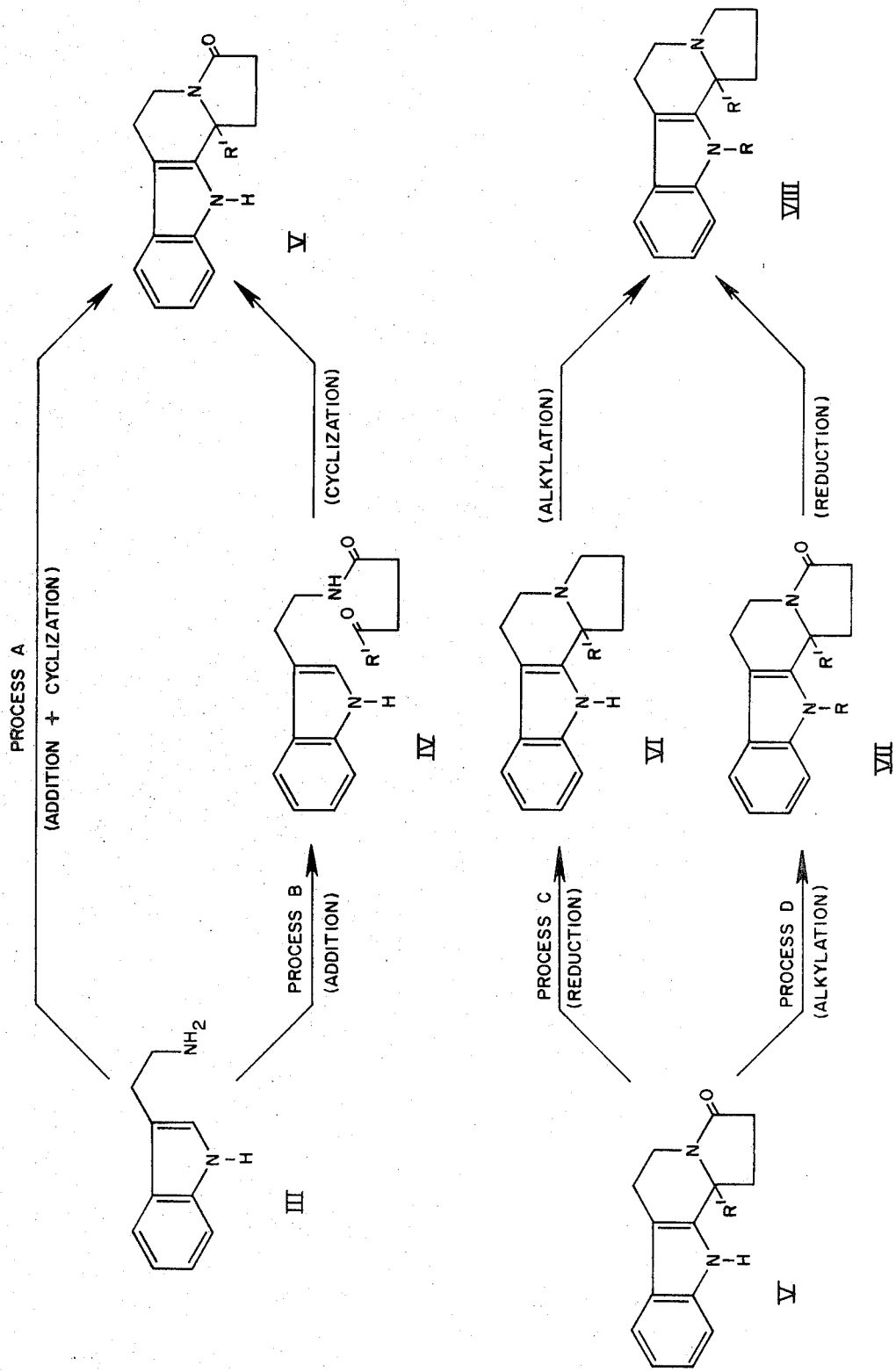

The manner and process for making the invention will now be described so as to enable a person skilled in the art of chemistry to make the same as follows:

Referring to FIG. I, wherein the compounds are assigned Roman numerals for identification, in Process A, tryptamine (III) is treated with a keto acid (II) of the formula:

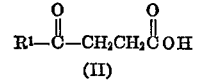

(II)

wherein $R^1$ is methyl or ethyl, to afford the lactam (V). The method employed in said process is similar to that described by S. Wawzonek and J. D. Nordstrom, J. Med. Chem., 8, 265 (1965). The tryptamines used in reaction described herein are readily available or may be prepared by methods similar to those described in E. Adlerova et al. Coll. Czech. Chem. Commun., 25, 784 (1960); Z. Pelchowicz and E. D. Bergman, J. Chem. Soc. 1960, 4699; and R. A. Abramovitch, J. Chem. Soc., 1956, 4593.

As an alternative to Process A, in Process B tryptamine (III) is first reacted with 5-(lower)alkyl-2(3H)-furanone to yield the keto amide (IV). Cyclization of said intermediate (IV) gives the lactam (V). This process is carried out by a method analogous to that described in F. Shiroyan, Arm. Khim. Zh., 20, 649 (1967).

The lactam (V) is converted to a compound of Formula VIII by either of two methods: (a) Process C, which involves reduction followed by $N_{ind}$-alkylation, or (b) Process D, which involves $N_{ind}$-alkylation followed by reduction. The reduction reactions are carried out preferably by contacting a compound of Formula V or VII with a reducing agent in a reaction-inert solvent under an inert atmosphere (e.g. lithium aluminum hydride in tetrahydrofuran under nitrogen) at about the reflux temperature of the mixture for a period of time ranging from about 2 to about 10 hours. Alternatively, the reduction can be performed by first converting the compound (V or VII) to a thioamide by contacting with phosphorous pentasulfide in an appropriate reaction inert organic solvent followed by reduction with Raney nickel using a method similar to that described in U.S. Pat. No. 3,454,583. The $N_{ind}$-alkylation reactions are performed by contacting a compound of Formula V or VI with a base in a reaction inert organic solvent (e.g. sodium hydride in dimethylformamide), and then adding an alkylating agent (e.g. a lower alkyl halide or tosylate) at a temperature ranging from about 0° C. to about 100° C. for a period of time ranging up to six hours.

8-fluoro-11,11b - dimethyl - 2,3,5,6,11,11b - hexahydro-1H-indolizino[8,7-b]indole can be prepared using methods similar to those heretofore described by reacting 5-fluoro-tryptamine [E. Adlerova et al., Coll. Czech. Chem. Commun., 25, 784 (1960)] with levulinic acid to afford 8-fluoro-1,2,5,6,11,11b-hexahydro-11b - methyl-3H-indolizino[8,7-b]indol-3-one which is methylated and reduced. Similarly, 2,3,5,6,11,11b-hexahydro-10,11,11b - trimethyl-1H-indolizino[8,7-b]indole is prepared from 7-methyl-tryptamine and levulinic acid, and 2,3,5,6,11,11b-hexahydro-2,11,11b-trimethyl-1H-indolizino[8,7-b]indole is prepared from tryptamine and 2-methyllevulinic acid [R. J. Reynolds Tobacco Co., C.A., 67 (No. 32,333), 3041 (1967)].

1,2,3,4,6,7,12,12b-octahydro-12,12b - dimethyl - indolo-[2,3-a]quinolizine is prepared from 2,3,6,7,12,12b-hexahydro-12b-methylindolo[2,3 - a]quinolizin - 4(IH) - one, which is a known compound [see F. Shiroyan et al., Arm. Khim, Zh., 210 649 (1967)] by the methylation and reduction methods heretofore described.

In the synthesis, the 11,11b-di(lower) alkyl-2,3,5,6,11,11b-hexahydro-1H-indolizino[8,7-b]indoles (VIII) are obtained as a racemic mixture consisting of the dextro- and levo-enantiomers which differ in configuration about the 11b-carbon. Resolution of the racemate to give the dextroform of the compounds of Formula VIII can be accomplished by conventional procedures. For example, the racemate may be treated with an optically active organic acid such as 2R:3R-tartaric acid, to yield a mixture of the corresponding acid addition salts. The salt derived from the dextro-isomer is then separated by crystallization, and the dextro-isomer in the form of the free base is obtained by treatment of the salt with a suitable strong base. It is obvious that resolution may be performed at an earlier stage. Thus, the dextro-form of intermediate VI can be alkylated so that subsequent alkylation will afford the dextro-form of the product (VIII).

The 11,11b-di(lower)alkyl - 2,3,5,6,11,11b - hexahydro-1H-indolizino[8,7-b]indoles and 1,2,3,4,6,7,12,12b-octahydro-12,12b-dimethylindolo[2,3-a]quinolizine are converted to the corresponding $N_b$-oxide derivatives (the compounds of Formula I) by reaction, in a known manner, with hydrogen peroxide or an organic peroxyacid. Suitable peroxyacids are peroxyformic, peroxyacetic, peroxytrifluoracetic, m-chloroperoxybenzoic, peroxyphthalic, and the lime. m-Chloroperoxybenzoic acid, is however, preferred. The peroxyacid may be either preformed or prepared in situ by the interaction of hydrogen peroxide with an appropriate carboxylic acid, as described in Fieser and Fieser, "Reagents for Organic Synthesis," John Wiley, 1967, pp. 457–465.

In general, the oxidation reaction is performed in a reaction-inert organic solvent at a temperature ranging from about —5° C. to about 50° C. for a period of time up to two hours. When an organic peroxyacid is used as the oxidizing agent, the preferred temperature range is from about —5° C. to about 5° C., and the preferred solvent is tetrahydrofuran. When hydrogen peroxide is used, the preferred temperature range is about 25° C. to 40° C., and the preferred solvent is a hydroxylic solvent such as a lower alkanol, for example methanol. When an organic peroxyacid is employed for the oxidation reaction, the $N_b$-oxide derivative will form an acid addition salt with the carboxylic acid formed by the decomposition of the peroxyacid selected. The salt formed thereby may be recovered, or it may be converted to a salt containing an anion other than that contained in the salt formed initially by contacting the salt with an organic or mineral acid having an acid strength greater than that of the carboxylic acid to which the $N_b$-oxide derivative was initially bound. For instance, when the oxidizing agent is m-chloroperoxybenzoic acid, the $N_b$-oxide derivative combines with m-chlorobenzoic acid. The m-chlorobenzoic acid addition salt can be contacted with hydrogen chloride to afford the hydrochloride salt.

When the starting material for the peroxidation reaction is the substantially pure dextro-isomer, the $N_b$-oxide product must be protonated or, if not protonated, it must be dissolved in a hydroxylic solvent to prevent racemization.

If desired, the $N_b$-oxide derivative as the acid addition salt may be converted to the corresponding free $N_b$-oxide derivative by contacting the salt with an appropriate base. If the neutralization is performed in a pharmaceutically acceptable solvent and if no toxic products are produced, the solution of the $N_b$-oxide free base can be used directly for the biological purposes herein described. For example, the salt may be dissolved in water and treated with sodium hydroxide in an amount sufficient to generate the base.

As used herein, the term "lower alkyl" means a methyl or ethyl group. The term "free $N_b$-oxides" means a compound in which none of the basic groups contained therein are protonated. The term "reaction-inert, organic solvent" means an organic solvent which dissolves the reactants but does not interfere with the oxidation reaction under the above-described reaction conditions. The term "hydroxylic solvent" means a lower alkanol (for example, methanol, ethanol, or propanol) or water, or mixtures thereof. The time and temperature ranges given above for the oxidation reactions are not critical and simply represent the most convenient ranges consistent with carrying out the reaction in a minimum of time without undue difficulty or undue formation of side products.

It is also understood that for the pharmacological purposes herein disclosed the compounds described and claimed as acid addition salts must be derived from organic and mineral acids which are non-toxic and pharmacologically acceptable. Although the processes described herein, may be carried out with any suitable acid, addition salts finally obtained must be derived from an appropriate non-toxic, pharmacologically acceptable acid. Among the suitable acids which may be utilized are, hydrochloric, hydrobromic, sulfuric, and acetic.

As employed herein, the term "dextro" (d) means having the property of rotating the plane of polarized light in a positive (+) direction, as measured by conventional polarimetric procedures, so that the specific rotation $[\alpha]_D^t$, of the compound being measured has a positive (+) value. The term "levo" (l) means having the property of rotating the plane of polarized light in a negative (—) direction so that the specific rotation has a negative (—).

When employed as analgesic agents, the active substances may be administered alone or in combination with pharmaceutically acceptable carriers, the proportion and nature of which are determined by the solubility and chemical properties of the compound selected, the chosen route of administration, and standard pharmaceutical practice. For example, the compounds of Formula I may be administered orally in solid dosage forms, e.g. capsules, tablets, or powders, or in liquid forms, e.g. solutions or suspensions. The compounds may also be injected parenterally in the form of sterile solutions or suspensions. Solid oral forms may contain conventional excipients, for instance: lactose, sucrose, magnesium stearate, starches, resins, and like materials. Liquid oral forms may contain various flavoring, coloring, preserving, stabilizing, solubilizing or suspending agents. Parenteral preparations are sterile aqueous or non-aqueous solutions or suspensions which may contain various preserving, stabilizing, buffering, solubilizing, or suspending agents. If desired, additives, such as saline or glucose may be added to make the solutions isotonic.

For parenteral administration, it is convenient to employ the compounds of the invention in the form of their pharmacologically acceptable acid addition salts, which are water soluble and thus may be readily incorporated into preparations suitable for injection. The salts are prepared by methods well known in the art. Appropriate salts are those formed from both inorganic and organic acids, for example:

The following examples are illustrative of the manner and processes of making and using the compounds of this invention.

EXAMPLE I di-1,2,5,6,11,11b-hexahydro-11b-methyl-3H-indolizino[8,7-b]indol-3-one Tryptamine (112.15 g.), levulinic acid (97.6 g., 85.6 ml.) and butyl Cellosolve (1 liter) are refluxed under nitrogen for sixteen hours and the solvent is removed. The residue is successively washed with water, dilute aqueous sodium hydroxide, water, dilute aqueous hydrochloric acid, water and dried. Trituration of the crude product, decomposition at 252–262° C., with methanol, and then with benzene, and drying provides 120.4 g. of the title compound, decomposition at 259–263° C.;

$\lambda_{max.}^{KBr}$ 3.09, 6.01, 6.17, 13.38$\mu$

EXAMPLE II dl-1,2,5,6,11,11b-hexahydro-11,11b-dimethyl-3H-indolizino[8,7-b]indol-3-one A suspension of 4.81 g. 1,2,5,6,11,11b-hexahydro-11b-methyl - 3H - indolizino[8,7-b]indol-3-one in 100 ml. dry dimethylformamide (DMF) is stirred under nitrogen with 1.06 g. of about 50% sodium hydride-mineral oil dispersion for 0.5 hour as hydrogen is evolved. The reaction solution is cooled in an ice-water bath as 3.41 g. methyl iodide (1.50 ml.) are added dropwise. After stirring for 0.5 hour at 0° C., the cooling bath is removed and the mixture is kept at about 25° C. for eighteen hours. After removal of solvent (in vacuo), the crude product is dissolved in chloroform, washed with water and dried with sodium sulfate. The solvent is removed and the residue is chromatographically purified on a 250 g. column of neutral, activity III alumina. The product isolated from the 1:4 and 1:1 ether-benzene eluates is crystallized from carbon tetrachloride (twice) and from ethyl acetate to afford 2.63 g. of the title compound, M.P. 131.5–134.5° C.;

$\lambda_{max.}^{KBr}$ 5.94$\mu$; $\lambda_{max.}^{95\% EtOH}$ 226.5 ($\epsilon$ 34,100), 276 sh. ($\epsilon$ 5,980), 282 ($\epsilon$ 6,360), 290 sh. ($\epsilon$ 5,490) nm.; $\lambda_{min.}^{95\% EtOH}$ 248 ($\epsilon$ 1,290) nm.

NMR (CDCl$_3$): $\beta$ 1.58 (singlet, 11b-methyl), 3.68 (singlet, 11-methyl), 4.47 (multiplet, C–5 proton) p.p.m.

*Analysis.*—Calculated for C$_{16}$H$_{18}$N$_2$O (percent): C, 75.56; H, 7.13; N, 11.02. Found (percent): C, 75.51; H, 7.17; N, 11.16.

EXAMPLE III dl-2,3,5,6,11,11b-hexahydro-11,11b-dimethyl-1H-indolizino[8,7-b]indole, hydrochloride (a) To a suspension of 3.00 g. lithium aluminum hydride in 100 ml. dry tetrahydrofuran (THF), under nitrogen, is added a solution of 9.15 g. 1,2,5,6,11,11b-hexahydro-11,11b-dimethyl - 3H - indolizino[8,7-b]indol-3-one in 100 ml. dry tetrahydrofuran such that gentle reflux is maintained. Refluxing is continued for two hours after combining the reactants. The reaction mixture is cooled in an ice-water bath, treated *dropwise* with 16 ml. 3.0% w./v. aqueous sodium hydroxide, stirred 0.25 hour, filtered and the solids are thoroughly washed with boiling tetrahydrofuran. Removal of solvent from the filtrate and washings yields a residue which is dissolved in 100 ml. 2 N hydrochloric acid and is washed with ether. The acidic solution is basified with 20 ml. concentrated ammonioum hydroxide and the white precipitate is extracted into ether. After washing with water and with brine, the ethereal solution is dried (sodium sulfate) and freed of solvent. The crude base is chromatographically purified on a 400 g. column of neutral, activity III alumina to provide, from the 1:1 benzene-hexane eluates, 6.40 g. of 2,3,5,6,11,11b-hexahydro - 11,11b - dimethyl-1H-indolizino[8,7-b]indole, M.P. 65–68° C. Treatment of the base, in anhydrous ether, with excess isopropanolic hydrogen chloride affords a salt which is twice recrystallized from acetone, thus yielding the title compound, decomposition 226–8° C.;

$\lambda_{max.}^{KBr}$ 3.90, 4.12, 13.46$\mu$; $\lambda_{max.}^{95\% EtOH}$ 224 ($\epsilon$ 35,100), 274 sh. ($\epsilon$ 6,780), 281 ($\epsilon$ 7,030), 291 sh. ($\epsilon$ 5,650) nm.; $\lambda_{min.}^{95\% EtOH}$ 245 ($\epsilon$ 2,040) nm.

NMR (CDCl$_3$): $\delta$ 2.13 (singlet 11b-methyl), 3.81 (singlet, 11-methyl) p.p.m.

*Analysis.*—Calculated for C$_{16}$H$_{20}$N$_2$·HCl (percent): C, 69.42; H, 7.65; Cl, 12.81; N, 10.12. Found (percent): C, 69.43; H, 7.69; Cl, 13.04; N, 10.04.

(b) Dry dimethylformamide (30 ml.), 1.81 g. 2,3,5,6,11,11b-hexahydro - 11b - methyl-1H-indolizino[8,7-b]indole [S. Wawzonek and J. D. Nordstrom, J. Med. Chem., 8, 265 (1965)] and 0.42 g. of about a 50% sodium hydride-mineral oil dispersion are stirred for one-half hour. The reaction mixture is cooled in an ice-water bath as 1.25 g. methyl iodide (0.55 ml.) in 3 ml. dry dimethylformamide are added dropwise. After stirring for 0.25 hour at 0° C., the mixture is kept at 25° C. for seven hours. Solvent is removed in vacuo and the residue, dissolved in ether, is washed with water, brine and dried (sodium sulfate). Distillation of the solvent and purification of the residue on 60 g. neutral, activity III alumina provide, from the 1:1 benzene-hexane eluates, a white solid. This amine is dissolved in 2 N hydrochloric acid, washed with ether and the acidic solution is basified with concentrated ammonium hydroxide. The precipitated base is extracted into ether, washed with water, brine and dried (sodium sulfate). Removal of solvent yields 1.07 g. 2,3,5,6,11,11b-hexahydro-11,11b-hexahydro - 11,11b - dimethyl-1H-indolizino[8,7-b]indole, M.P. 66.0–68.5° C.; which, by infrared, ultraviolet and nuclear magnetic resonance spectral comparisons, is identical with the base prepared by the procedure of (a) above.

EXAMPLE IV dl-2,3,5,6,11,11b-hexahydro-11,11b-dimethyl-1H-indolizino[8,7-b]indolo 4-oxide 2,3,5,6,11,11b-hexhydro - 11,11b - dimethyl-1H - indolizino[8,7-b]indole (480 mg.) in 10 ml. dichloromethane is cooled in an ice-water bath and is treated with a solution of 381 mg. m-chloroperbenzoic acid in 11 ml. dichloromethane. After standing for one-half hour, at 0° C., the reaction solution is diluted with 20 ml. dichloromethane, washed with 5% w./v. aqueous sodium hydroxide, with water and is dried over sodium sulfate. Removal of solvent gives 150 mg. of the crude title compound as a brown gum, $\lambda_{max.}^{95\% EtOH}$ 223.5 ($\epsilon$ 31,280), 273 sh. ($\epsilon$ 5,790), 279 ($\epsilon$ 5,810), 290 sh. ($\epsilon$ 4,690) m$\mu$; $\lambda_{max.}^{95\% EtOH}$ 243 ($\epsilon$ 1,920) m$\mu$ Mass spectral examination of the gum indicates that M$^+$=256. The Rf of this product, as determined on a 250$\mu$ thick silica gel plate, following development with 6:3:1 dichloromethane-benzene-triethylamine and visualization with Dragendorf's reagent, is 0.00 while that of the starting base is 0.50.

EXAMPLE V di-2,3,5,6,11,11b-hexahydro-11,11b-dimethyl-1H-indolizino[8,7-b]indole 4-oxide, hydrochloride To 24.03 g. 2,3,5,6,11,11b-hexahydro-11,11b-dimethyl-1H-indolizino[8,7-b]indole in 100 ml. dry tetrahydrofuran is added, during 10 minutes, a solution of 20.30 g. 85% m-chloroperoxybenzoic acid in 50 ml. dry THF keeping the reaction temperature at 0°±5° C. After stirring 15 minutes, the reaction mixture is treated with 31 ml. ca 3.35 N isopropanolic hydrogen chloride whereupon a green solution is formed followed by separation of a solid. The mixture is stirred at 0° C. for 10 minutes, 150 ml. anhydrous ether are added and the solids are collected and thoroughly washed with ether. The 27.06 g. salt, dec. 197–200° C. are recrystallized twice from acetonitrile to provide 20.85 g. title compound as slightly gray crystals, dec. 206–209° C.;

$\lambda_{max.}^{KBr.}$ 4.15, 13.15$\mu$; $\lambda_{max.}^{95\% \, EtOH}$ 222.5 ($\epsilon$ 39,450), 271 ($\epsilon$ 7,140), 280, ($\epsilon$ 7,140), 292 sh. ($\epsilon$ 5,190) nm.; $\lambda_{min.}^{95\% \, EtOH}$ 242 ($\epsilon$ 1,460), 277 ($\epsilon$ 7,060) nm.

NMR (CDCl$_3$): $\delta$ 1.98 (singlet, 11b-methyl), 3.81 (singlet, 11-methyl) p.p.m.

*Analysis.*—Calculated for C$_{16}$H$_{20}$N$_2$O·HCl (percent): C, 65.63; H, 7.23; Cl,12.11; N, 9.57. Found (percent): C, 65.50; H, 7.40; Cl, 12.31; N, 9.46.

EXAMPLE VI

Optical isomer of 2,3,5,6,11,11b-hexahydro-11,11b-dimethyl-1H-indolizino[8,7-b]indole, hydrochloride

*Dextro isomer.*—A warm (50° C.) solution of 15.00 g. 2A:3R-tartaric acid, 0.10 mole [[$\alpha$]$_D^{24}$ + 12.7° C. (c., 19.95, H$_2$O)] in 600 ml. acetone is treated with a warm (50° C.) solution of 24.03 g. 2, 3, 5,6,11,11b-hexahydro-11,11b-dimethyl-1H-indolizino[8,7-b]indole (0.10 mole) in 40 ml. methanol. After seeding with the positive-rotating isomer, the solution is kept at about 25° C. for sixty-six hours. The cream-colored solid that separates is dried and thrice crystallized from acetonitrile to provide 8.95 g. d-2,2,5,6,11,11b-hexahydro-11,11b-dimethyl-1H-indolizino[8,7-b]indole, 2R:3R-tartrate (mono): decomposition 156.0–158.5° C., [$\alpha$]$_D^{24}$ +66.4 C. (c. 1.044, MeOH). A solution of 7.0 g. of the preceding salt in 50 ml. of water is basified and aqueous sodium hydroxide and the base is extracted with toluene. The combined extracts are washed with water, with brine and dried (sodium sulfate). Removal of the solvent affords 4.1 g. base as a barely yellow oil, [$\alpha$]$_D^{25}$ +99.1° C. (c. 0.982, MeOH), Dissolution of 3.93 g. base in 100 ml. anhydrous ether followed by addition of excess isopropanolic hydrogen chloride causes precipitation of a salt which is crystallized from dichlorometane-acetone. The 3.65 g. white, crystalline d - 2,3,5,6,11,11b - hexahydro-11,11b-dimethyl-1H-indolizino[8,7-b]indole, hydrochloride thus isolated decomposes at 247.5–249.5° C.: [$\alpha$]$_D^{24}$ +72.5° (c. 1.038, MeOH).

*Levo isomer.*—The acetone-methanol filtrate remaining after separation of the crude 2R:3R-tartrate is freed of solvent and the residue is dissolved in 250 ml. water. Basification of the brown solution with aqueous sodium hydroxide is followed by thorough extraction with toluene and the combined extracts are washed with water, with brine, dried (sodium sulfate) and freed of solvent. A solution of the residual brown gum in 25 ml. methanol is added to a warm (50° C.) solution of 8.96 g. 2S:3S-tartaric acid, 0.06 mole [[$\alpha$]$_D$ —12.8° C. ($\epsilon$ 19.99, H$_2$O)], in 350 ml. acetone. After seeding with the negative rotating isomer, the solution is kept at 25° C. for sixteen hours. The solid that separates is dried and thrice crystallized from acetonitrile to yield 10.7 g. 1-2,3,5,6,11,11b-hexahydro-11,11b-dimethyl-1H-indolizino[8,7-b] indole, 2S:3S-tartrate (mono), decomposition 156.0–158..5 C., [$\alpha$]$_D^{24}$ —66.7° C. (c. 1.035 MeOH). The salt (8.0 g.) is converted, in exactly the above manner, to 4.81 g. base, [$\alpha$]$_D^{25}$ —96.3° C. (c. 0.963 MeOH) and then to 4.32 g. white crystalline l-2,3,5,6,11,11b-hexahydro-11,11b-dimethyl-1H-indolizino[8,7-b]indole, hydrochloride, decomposition 247.5–249.5° C., [$\alpha$]$_D^{25}$ —72.3° C. (c. 1.059, MeOH).

EXAMPLE VII

Dextro-2,3,5,6,11,11b-hexahydro - 11,11b - dimethyl-1H-indolizino[8,7-b]indole 4-oxide, hydrochloride Method (a): To 9.22 g. of dextro-2,3,5,6,11,11b-hexahydro - 11,11b-dimethyl-1H-indolizino[8,7-b]indole in 50 ml. of dry tetrahydrofuran (THF) is added, during 10 minutes, a solution of 7.79 g. of 85% m-chloroperoxybenzoic acid in 20 ml. dry tetrahydrofuran (THF) keeping the reaction mixture at 0°±5° C. After stirring 15 minutes, the reaction mixture is treated with 12 ml. of ca. 3.35 N isopropanolic hydrogen chloride. A solid separates from the reaction solution. The mixture is stirred at 0° C. for 10 minutes after which 70 ml. of anhydrous ether are added. Solid material is then collected and thoroughly washed with ether. Upon rapid recrystallization (twice) from acetonitrile, there are obtained 8.25 g. (73%) of material which is dextro - 2,3,5,6,11,11b - hexahydro-11,11b-dimethyl-1H-indolizino[8,7-b]indole 4-oxide, hydrochloride, dec. 205–208° C.; [$\alpha$]$_D^{20}$ +56.95° C. (c., 1.108 methanol) [a]; [$\alpha$]$_D^{25}$ +53.7° C. (c. 0.9825, methanol)[b];

$\lambda_{max.}^{KBr.}$ 3.77, 4.15$\mu$; $\lambda_{max.}^{95\% \, EtOH}$ 222 ($\epsilon$ 40,100) 271 ($\epsilon$ 7,770), 280 ($\epsilon$ 7,350), 291 sh. ($\epsilon$ 5,280) nm.; $\lambda_{min.}^{95\% \, EtOH}$ 242 ($\epsilon$ 1,990), 277 ($\epsilon$ 7,300) nm.

NMR (CDCl$_3$): $\delta$ 1.97 (singlet, 11b-methyl), 3.82 (singlet, 11-methyl), 4.78 (2-proton multiplet, protons at C–3 and C–5 p.p.m.

The mass spectrum (determined at 170° C./1.10$^{-6}$ torr, 70 electron volts) exhibits a weak molecular ion at m/e= 256 and prominent ions at m/e=240, 239, 238, 225, and 223.

*Analysis.*—Calculated for C$_{16}$H$_{20}$N$_2$O·HCl (percent): C, 65.63; H, 7.23; Cl, 12.11; N, 9.57. Found (percent): C, 65.88; H, 7.28; Cl, 11.90; N, 9.83.

Method (b): A solution of 78.5 g. dextro-2,3,5,6,11, 11b - hexahydro - 11,11b - dimethyl-1H-indolizino[8,7-b] indole in ca. 450 ml. dry THF is stirred and kept at —5 to 0° C. as a solution of 66.0 g. 85% m-chloroperoxybenzoic acid in 160 ml. dry THF is added during a 35–40 minute period. Isopropanolic hydrogen chloride (100 ml., 3.25 N) then is added during 10 minutes keeping the reaction temperature at —5 to 0° C. The precipitate is collected, washed with 400 ml. cold (5–10° C.) THF and dried to provide 93.7 g. crude salt, dec. 198–200° C.

An 113 g. quantity of crude salt, prepared as above, is dissolved in 450 ml. warm methanol (50° C.). The methanol solution is diluted with 1.13 liter ethyl acetate during 15 minutes as the temperature is maintained at 45 to 50° C. The crystalline suspension is cooled at 30° C. (1 hour) and at 0 to 2° C. (18 hours) and the product is collected. After washing with 50 ml. cold (5° C.) ethyl acetate and thorough drying, 85.1 g. of dextro-2,3,5, 6,11,11b - hexahydro - 11,11b - dimethyl-1H-indolizino-8,7-b]indol 4-oxide, hydrochloride, dec. 206–209° C., [$\alpha$]$_D^{20}$ +56.5° C. (c., 1.005, methanol)[a] are isolated.

In parts (a) and (b) above of this example the superscript "(a)" after the rotation values means that the rotation was measured in a 1-dm. quartz cell with a constant temperature water jacket using a Perkin-Elmer Model 141 automatic polarimeter. The superscript "(b)" means that the rotation was measured in a non-thermostated 0.5 dm. cell using a Zeiss LEP A2 polarimeter by extrapolation of readings taken at 578 nm. and 546 nm.

EXAMPLE VIII

The analgesic activity of the compound of Formula I can be elicited and demonstrated in rats by employing the following procedure:

Groups of ten male rats (150–200 gm.) are placed in individual holders. Each rat is positioned so that a high intensity light beam shines on the tip of the tail. The intensity of the light beam is adjusted so that a rat will respond to the heat so produced by moving its tail out of the beam in 3 to 8 seconds. The average of two readings taken 20 minutes apart serves as a control. Rats are selected for testing whose control readings agree within one second. The compound to be evaluated can be administered either orally (P.O.), intraperitoneally (I.P.) or intramuscularly (I.M.) and reaction times are measured every 20 minutes for two hours after drug administration. Post drug-reaction times are compared to the control average and are treated for statistical significance. Analgesic activity is indicated by the ability of the compound to prolong the reaction time. The $ED_{50}$ is defined as the dose of test compound sufficient to cause 50% of the animals to exhibit a positive response. When utilized in the above procedure, dextro-2,3,5,6,11,11b-hexahydro-11,11b - dimethyl - 1H - indolizino[8,7-b]indole-4-oxide, hydrochloride exhibits an $ED_{50}$ of 1.45 mg./kg. (I.P.), 1.68 mg./kg. (I.M.), and 1.92 (P.O.). dl-2,3,5,6,11,11b-hexahydro - 11,11b - dimethyl - 1H-indolizino[8,7-b]indole 4-oxide, hydrochloride, exhibits an $ED_{50}$ of 3.12 mg./kg. (I.P.), 5.0 mg./kg. (I.M.) and 5.0 mg./kg. (P.O.). Levo - 2,3,5,6,11,11b-hexahydro-11,11b-dimethyl-1H-indolizino[8,7-b]indole 4-oxide, hydrochloride does not show analgesic activity at a dose of 50 mg./kg. I.P. In this test, morphine exhibits an $ED_{50}$ of 10 mg./kg. (P.O.), 2.0 mg./kg. (I.M.), and 3.5 mg./kg. (I.P.).

The subject matter which the applicants regard as their invention is particularly pointed out and distinctly claimed as follows:

1. 2,3,5,6,11,11b - hexahydro - 11,11b - dimethyl-1H-indolizino[8,7-b]indole 4-oxide, and the pharmacologically acceptable non-toxic acid addition salts thereof.

2. A compound as defined in claim 1 which is 2,3,5,6, 11,11b - hexahydro - 11,11b - dimethyl - 1H - indolizino-[8,7-b]indole 4-oxide, hydrochloride.

3. A compound as defined in claim 1 which is dextro-2,3,5,6,11,11b - hexahydro - 11,11b-dimethyl-1H-indolizino[8,7-b]indole 4-oxide, and the pharmacologically acceptable, nontoxic acid addition salts thereof.

4. A compound as defined in claim 3 which is dextro-2,3,5,6,11,11b - hexahydro - 11,11b - dimethyl-1H-indolizino[8,7-b]indole 4-oxide, hydrochloride.

5. 11b-ethyl - 2,3,5,6,11,11b - hexahydro - 11 - methyl-1H-indolizino[8,7-b]indole 4-oxide, and the pharmacologically acceptable acid addition salts thereof.

6. 11-ethyl - 2,3,5,6,11,11b - hexahydro - 11b - methyl-1H-indolizino[8,7-b]indole 4-oxide, and the pharmacologically acceptable acid addition salts thereof.

7. 2,3,5,6,11,11b - hexahydro - 10,11,11b-trimethyl-1H-indolizino[8,7-b]indole 4-oxide and the pharmacologically acceptable acid addition salts thereof.

8. 8-fluoro - 11,11b - dimethyl - 2,3,5,6,11,11b - hexahydro-1H-indolizino[8,7-b]indole 4-oxide, and the pharmacologically acceptable acid addition salts thereof.

9. 2,3,5,6,11,11b - hexahydro - 2,11,11b - trimethyl-1H-indolizino[8,7-b]indole 4-oxide, and the pharmacologically acceptable acid addition salts thereof.

10. 1,2,3,4,6,7,12,12b - octahydro - 12,12b - dimethyl-indolo[2,3-a]quinolizine 5-oxide and the pharmacologically acceptable acid addition salts thereof.

References Cited

UNITED STATES PATENTS 3,478,051  11/1969  Houlihan et al. ___ 260—326.12

OTHER REFERENCES

Wawzonek et al.: J. Med. Chem. 8(2), 265–7 (1965).
Herbst et al.: J. Med. Chem. 9(6), 864–8 (1966).
Shiroyan et al.: Arm. Khim. Zh, 21, 44–50 (1968); Chem. Abstracts, 69:86848s (1968).
Shiroyan et al.: Arm. Khim. Zh, 21, 1025–33 (1968); Chem. Abstracts, 71:112836z (1969).

HENRY R. JILES, Primary Examiner

G. T. TODD, Assistant Examiner

U.S. Cl. X.R.

260—296 P, 999